No. 647,898. Patented Apr. 17, 1900.
R. J. C. MITCHELL.
NOISELESS TIRE FOR VEHICLE WHEELS.
(Application filed Oct. 4, 1899.)

(No Model.)

WITNESSES
S. C. Connor
E. C. Sarlee

INVENTOR
Robert J. C. Mitchell
by his Attorneys
Howson and Howson

UNITED STATES PATENT OFFICE.

ROBERT J. C. MITCHELL, OF WATERFOOT, ENGLAND.

NOISELESS TIRE FOR VEHICLE-WHEELS.

SPECIFICATION forming part of Letters Patent No. 647,898, dated April 17, 1900.

Application filed October 4, 1899. Serial No. 732,547. (No model.)

*To all whom it may concern:*

Be it known that I, ROBERT J. C. MITCHELL, a subject of the Queen of Great Britain, residing at Waterfoot, in the county of Lancaster, England, have invented new and useful Improvements in Noiseless Tires for the Wheels of Bicycles, Motor-Cars, and other Vehicles, of which the following is a specification.

The object of this invention is to manufacture an improved noiseless and seamless solid tire for the wheels of bicycles, motor-cars, and other vehicles or carriages in substitution for the india-rubber tires, either solid or pneumatic, at present in use.

The invention consists principally in manufacturing such noiseless and seamless tires from solid felt hardened and milled to the required consistency to render the same solid and durable and impervious to moisture without impairing its elasticity or resilience and noiseless qualities.

Figure 4:
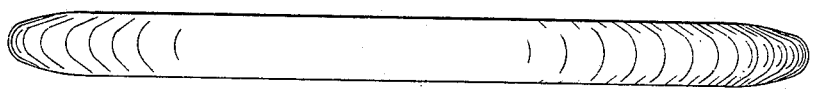
Figure 4:
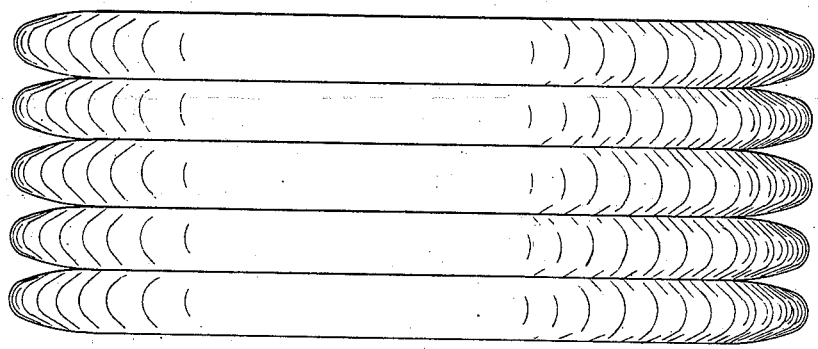
Figure 3:
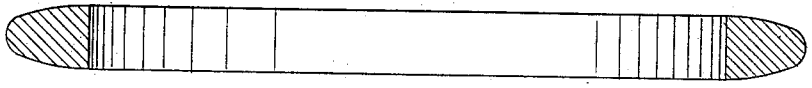
Figure 2:
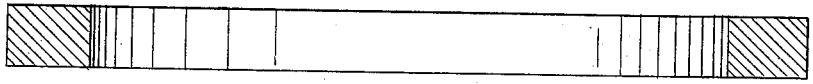
Figure 1:
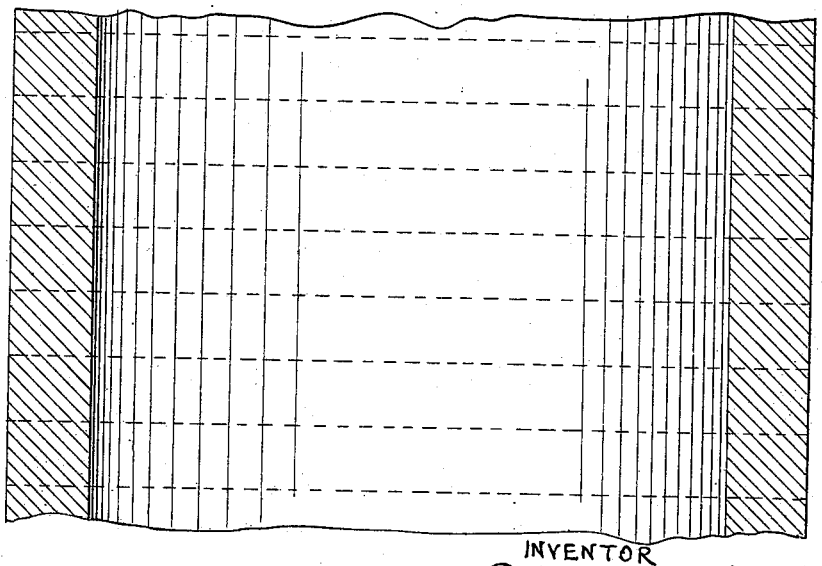

In the accompanying drawings, Figures 1, 2, and 3 are sectional views showing successive stages of manufacture of my improved tire, and Fig. 4 is an edge view illustrating a modified method of procedure.

For the purpose of my invention I first manufacture, by felting and hardening upon a suitable cylindrical bed or former, a cylinder of solid felt, as shown in section at Fig. 1 of the drawings, of an internal diameter corresponding with the outer circumference of the metallic or other rim or felly of the wheel to which the tire is to be applied and of any convenient width and of a suitable thickness according to the depth of tire required. This hardening process makes the material as hard and solid as leather and of such a consistency that it can be turned in a lathe or otherwise worked by ordinary cutting-tools. I then cut off from this cylinder of hardened felt a series of rings (one of which is shown in section at Fig. 2 on the drawings) of a suitable width to form the tires required, and I then turn them in a lathe to the required form and size, as shown at Fig. 3. I may impregnate them with a suitable waterproof solution or composition or otherwise treat them so as to further harden or solidify the same without in any way impairing or otherwise interfering with their resilient and noiseless qualities.

Sometimes instead of cutting off the rings, Fig. 2, first and then turning them separately in a lathe to the required form I place the whole cylinder on a former or chuck in the lathe and turn all the rings thereon side by side and afterward cut them off *seriatim*, as shown at Fig. 4.

The noiseless and seamless tires thus manufactured and prepared can be stretched over the edges of the metallic or other rim or felly of a wheel and, if desired, may be cemented thereto by india-rubber solution or other waterproof cement or may be otherwise attached thereto. They will be much more durable, less costly, resilient, and noiseless, not subject to side slipping, and much less liable to deterioration from the effects of heat, cold, or moisture than the tires manufactured either partly or wholly of india-rubber, which are ordinarily employed when noiseless tires are desired. Being made entirely without joint or seam they are much less liable to fracture.

I am aware that it has been proposed to make tires of felt; but felt of the ordinary make is not practically useful.

I claim as my invention—

1. As a new article of manufacture, a seamless tire of solid felt milled and hardened to the consistency of leather and shaped or turned by a cutting-tool, substantially as described.

2. The mode herein described of making felt tires, consisting in felting and hardening a hollow cylinder of solid felt of the consistency of leather and of an internal diameter corresponding with the outer circumference of the rim of the wheel to which it is to be applied, and then cutting and turning in a lathe ring-tires from this cylinder, substantially as described.

In testimony whereof I have signed my name to this specification in the presence of two subscribing witnesses.

ROBERT J. C. MITCHELL.

Witnesses:
 JNO. HUGHES,
 J. ERNEST HUGHES.